United States Patent
Kim

(10) Patent No.: US 10,414,366 B2
(45) Date of Patent: Sep. 17, 2019

(54) FRONT VEHICLE BODY REINFORCING STRUCTURE

(71) Applicants: Hyundai Motor Company, Seoul (KR); Kia Motors Corporation, Seoul (KR)

(72) Inventor: Hyunsik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 34 days.

(21) Appl. No.: 15/933,859

(22) Filed: Mar. 23, 2018

(65) Prior Publication Data
US 2019/0176734 A1    Jun. 13, 2019

(30) Foreign Application Priority Data
Dec. 8, 2017    (KR) .......................... 10-2017-0168217

(51) Int. Cl.
*B60R 19/34*    (2006.01)
*B62D 21/15*    (2006.01)
(52) U.S. Cl.
CPC ............ *B60R 19/34* (2013.01); *B62D 21/155* (2013.01)

(58) Field of Classification Search
CPC .............................. B60R 19/34; B62D 21/155
USPC ....................................................... 296/187.1
See application file for complete search history.

(56) References Cited

U.S. PATENT DOCUMENTS

| 5,484,034 A * | 1/1996 | Benz .................... B62D 25/082 180/294 |
| 7,469,956 B2 | 12/2008 | Yasuhara et al. |
| 2014/0361561 A1* | 12/2014 | Kuriyama ............... B60R 19/34 293/133 |
| 2015/0360633 A1* | 12/2015 | Nishida ................ B62D 21/152 293/133 |
| 2017/0274851 A1* | 9/2017 | Schneider ............... B60R 19/18 |
| 2018/0370571 A1* | 12/2018 | Sekiya ................. B62D 21/152 |

* cited by examiner

*Primary Examiner* — Pinel E Romain
(74) *Attorney, Agent, or Firm* — Morgan, Lewis & Bockius LLP

(57) ABSTRACT

A front vehicle body reinforcing structure may include a sub-frame mounting member combined to a lower side of a front end portion of the front side member and to an inside of a front end portion in a width direction of the fender apron member, wherein an inside surface in a width direction of a vehicle body of the front end portion of the fender apron member is connected to an outside surface in a width direction of the vehicle body of the front side member and to an outside surface in a width direction of the vehicle body of the sub-frame mounting member.

10 Claims, 4 Drawing Sheets

FRONT VEHICLE BODY REINFORCING STRUCTURE

CROSS-REFERENCE TO RELATED APPLICATION

The present application claims priority to Korean Patent Application No. 10-2017-0168217 filed on Dec. 8, 2017, the entire contents of which is incorporated herein for all purposes by this reference.

BACKGROUND OF THE INVENTION

Field of the Invention

The present invention relates to a front vehicle body reinforcing structure, and more particularly, to a front vehicle body reinforcing structure that may improve performance in coping with a head-on collision and a front small overlap collision of a vehicle.

Description of Related Art

Generally, a front vehicle body of a vehicle is a frame structure which is positioned at a front side in the longitudinal direction of the vehicle while forming an engine compartment, and includes a front end module that forms a front portion of the engine compartment and accommodates a cooling module, a head lamp, etc., a front fender apron member that forms left and right portions of the engine compartment and in which wheels are disposed, and a firewall which is positioned at a rear portion of the engine compartment and partitions a passenger compartment and the engine compartment.

Also, below the engine compartment, front side members extending in the longitudinal direction of the vehicle are disposed at left and right sides, respectively, to reinforce structural strength of the front vehicle body, and a sub-frame is disposed below the front side member to install and support the engine and a transmission at the engine compartment as well as a suspension system, etc.

A bumper beam, which extends in a width direction of the vehicle, is mounted at a front tip portion of the front side member to improve performance in coping with a frontal collision of the vehicle, and the bumper beam is connected, with a crash box, to the front tip portion of the front side member in the front and rear direction of the vehicle.

When the vehicle provided with the front vehicle body having the above-described structure frontally collides with an object including an obstacle or another vehicle with a small overlap while the vehicle is traveling, that is, when a collision object including a small overlap barrier collides with an external portion of the vehicle body in a state in which the collision object deviates to one side in a width direction of the vehicle, since the collision object collides with an external vehicle body portion with relatively weak rigidity in a state in which it deviates from the front side member, occupants cannot be safely protected because the front side member cannot effectively cope with the frontal small overlap collision of the vehicle, and excessive collision damage to the vehicle is caused.

To solve the problem, methods for coping with the small overlap collision by reinforcing the external portion of the vehicle body are being developed.

For example, by extending a frontal front end portion of the front fender apron member to a frontal front end portion of the front side member, a structure in which connecting members are connected to each other or a structure in which a reinforcement member for preventing the collision object from breaking in is mounted on the external side of the front side member is provided, but it is not effective for coping with the front small overlap collision.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front vehicle body reinforcing structure having advantages of improving collision stability by absorbing impact energy applied to a front side member by a fender apron member and appropriately dispersing impact energy applied to the front side member and the fender apron member to other parts of a vehicle body when a vehicle is in a head-on collision, an offset collision, or a small overlap collision.

A front vehicle body reinforcing structure according to an exemplary embodiment of the present invention may be a front vehicle body reinforcing structure for a part at which a front side member and a fender apron member are connected to each other in a front vehicle body.

The front vehicle body reinforcing structure may include a sub-frame mounting member combined to a lower side of a front end portion of the front side member and to an inside of a front end portion in a width direction of the fender apron member.

An inside surface in a width direction of a vehicle body of the front end portion of the fender apron member may be connected to an outside surface in a width direction of the vehicle body of the front side member and to an outside surface in a width direction of the vehicle body of the sub-frame mounting member.

The front end portion of the fender apron member may have a three-dimensional box structure which forms a closed section in an up and down direction of the vehicle body, and the front side member may have a three-dimensional box structure which forms a closed section in a front and rear direction of the vehicle body.

The sub-frame mounting member may have a three-dimensional box structure which forms a closed section in an up and down direction of the vehicle body.

An extending direction of the front end portion of the fender apron member and an extending direction of the front end portion of the front side member may be disposed to be skewed.

An included angle between an extension line of the fender apron member which is extended to be upwardly slanted toward the rear of the vehicle body and an extension line of the front side member which is extended in a front and rear direction of the vehicle body may be small in comparison with a case of positioning an extending direction of the front end portion of the fender apron member and an extending direction of the front end portion of the front side member to be parallel to each other.

A front end portion of the front side member, a front end portion of the fender apron member, and a front end portion of the sub-frame mounting member may be disposed on the same plane with respect to a front and rear direction of the vehicle body.

A lower end portion of the fender apron member and a lower end portion of the sub-frame mounting member may be disposed on the same plane with respect to an up and down direction of the vehicle body.

The front vehicle body reinforcing structure may further include a mounting device combined to the sub-frame mounting member.

The mounting device may include an engaging portion protruded downwardly under the sub-frame mounting member, an inserted portion inserted into the sub-frame mounting member from below the vehicle body, and a latch protrusion formed between the engaging portion and the inserted portion to prevent downward escape from the sub-frame mounting member.

An accommodating hole accommodating an upper end portion of the inserted portion may be formed at a lower end portion of the front end portion of the front side member.

A side surface of the inserted portion may be supported by a seating groove which is formed at the inside of the front end portion in a width direction of the fender apron member.

The accommodating hole and the seating groove may be respectively formed in a shape to correspond with the upper end portion of the inserted portion and the side surface of the inserted portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
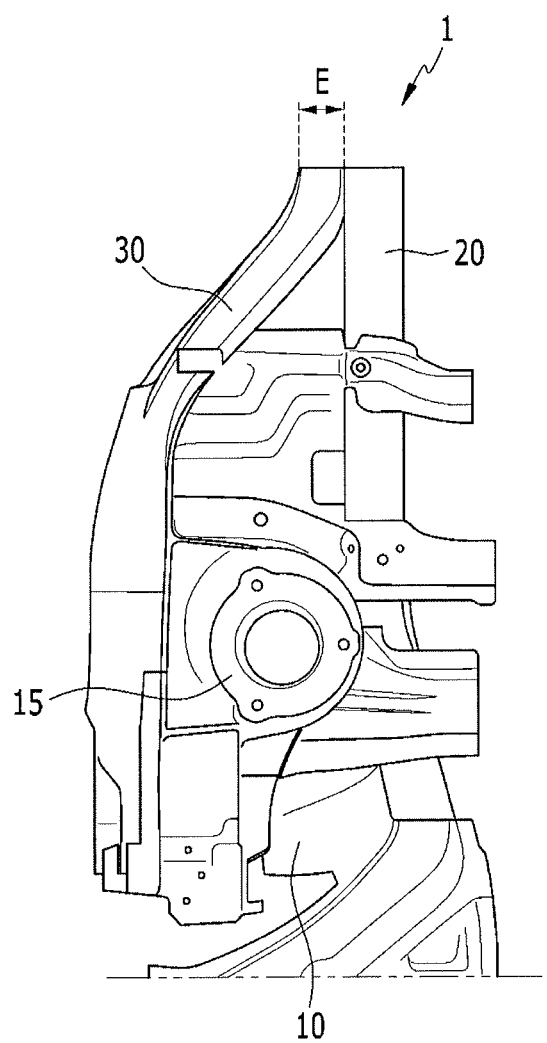
FIG. 1 is a top plan view of a front vehicle body reinforcing structure according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
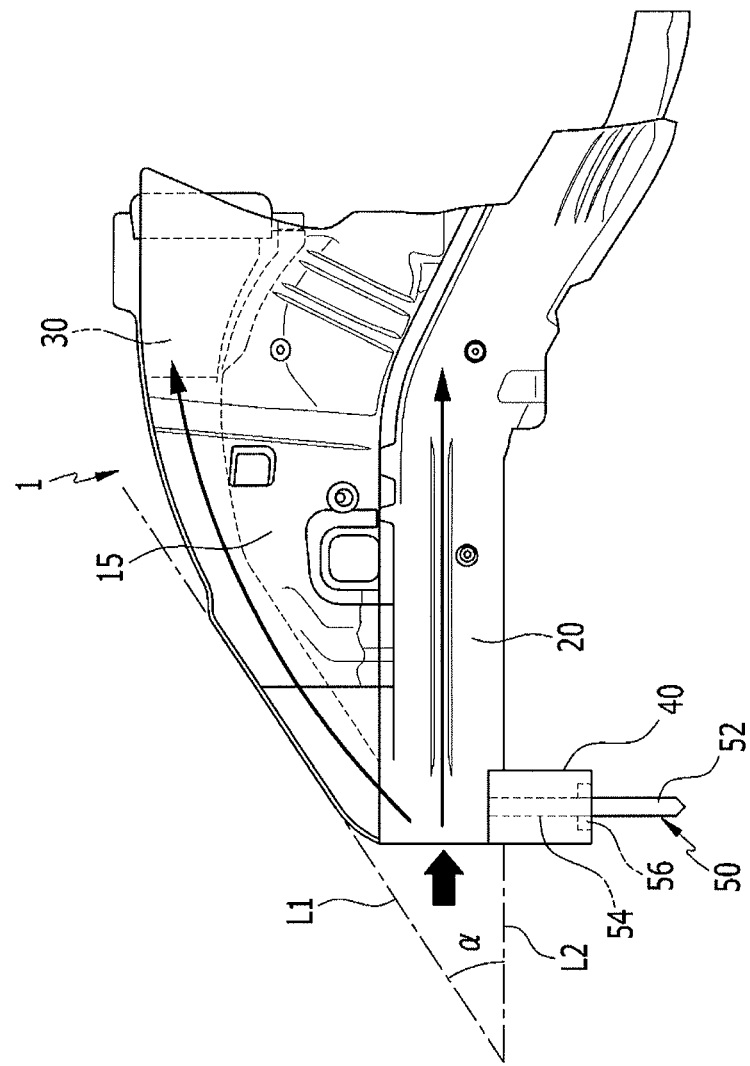
FIG. 2 is a side view of the front vehicle body reinforcing structure according to the exemplary embodiment of the present invention.

FIG. 1 is a top plan view of a front vehicle body reinforcing structure according to an exemplary embodiment of the present invention, and FIG. 2 is a side view of the front vehicle body reinforcing structure according to the exemplary embodiment of the present invention.

As shown in FIG. 1 and FIG. 2, a front vehicle body reinforcing structure 1 according to an exemplary embodiment of the present invention is a reinforcing structure for a part at which a front side member 20 and a fender apron member 30 are overlapped in the front of a shock absorber housing 15.

A shock absorber is mounted to the shock absorber housing 15. Furthermore, the shock absorber housing 15 is disposed to surround the shock absorber. Herein, the shock absorber is well-known to a person of ordinary skill in the art, so a detailed description thereof will be omitted.

The front side member 20 is disposed inside of the shock absorber housing 15 with respect to a width direction of a vehicle body 10, and is connected to a lower end portion of an inside surface in a width direction of the vehicle body 10 of the shock absorber housing 15.

The fender apron member 30 is disposed outside of the front side member 20 with respect to a width direction of the vehicle body 10 such that the shock absorber housing 15 is positioned between the fender apron member 30 and the front side member 20. Furthermore, a front end portion of the fender apron member 30 is connected to a front end portion of the front side member 20 which extends forwardly to the front of the vehicle body 10 in comparison with the shock absorber housing 15. Furthermore, the fender apron member 30 extends to be upwardly slanted toward the rear of the vehicle body 10 to be connected to a fender apron upper member. That is, the fender apron member 30 is provided to connect the front side member 20 and the fender apron upper member. Therefore, the fender apron member 30 is configured to receive and then disperse a load acting to the front side member 20 which is extended in a front and rear direction of the vehicle body 10 when a vehicle is in a head-on collision, an offset collision, or a small overlap collision.

Herein, the offset collision means a partial head-on collision, and the small overlap collision means a local partial collision, in which most of the collision load is applied to one side member of front side members 20, among the offset collision.

Meanwhile, the fender apron upper member, which is a constituent element of the vehicle body 10 by being disposed outside a cowl with respect to a width direction of the vehicle body 10 and being connected to a upper end portion of an outside surface in a width direction of the vehicle body 10 of the shock absorber housing 15, is well-known to a person of ordinary skill in the art, so a detailed description thereof will be omitted.

The front end portion of the fender apron member 30 has a three-dimensional box structure which forms a closed section in an up and down direction of the vehicle body 10, and the front side member 20 has a three-dimensional box structure which forms a closed section in a front and rear direction of the vehicle body 10. In other words, an extending direction of the front end portion of the fender apron member 30 and an extending direction of the front end portion of the front side member 20 are not in parallel to each other but are disposed to be skewed. Therefore, an included angle (a) between an extension line L1 of the fender apron member 30 which extends to be upwardly slanted toward the rear of the vehicle body 10 and an extension line L2 of the front side member 20 which extends in a front and rear direction of the vehicle body 10 is small in comparison with a case that an extending direction of the front end portion of the fender apron member 30 and an extending direction of the front end portion of the front side member 20 are in parallel to each other. In this regard, in a case that the included angle (a) is small, structural rigidity to a head-on collision is strong and a load transferred along the fender apron member 30 and the front side member 20 is effectively dispersed. In FIG. 2, a direction of dispersing a load is roughly illustrated by arrows.

Figure 3:
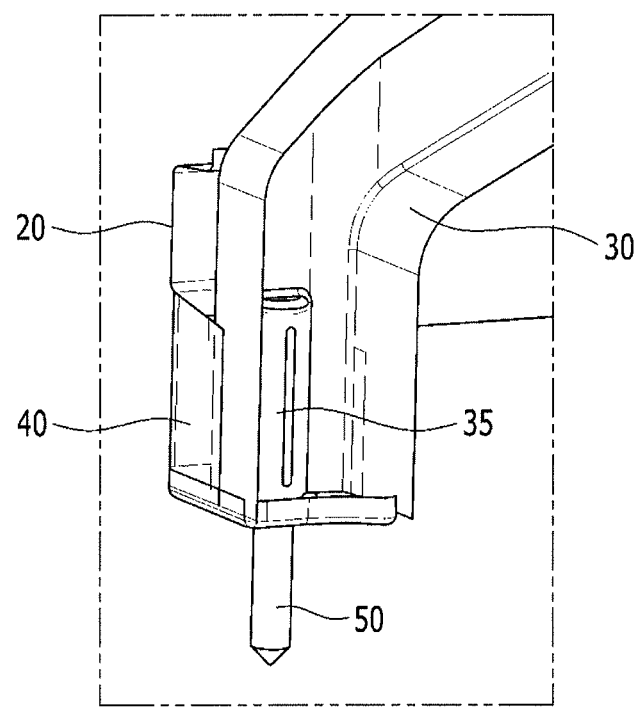
FIG. 3 is a partial perspective view of the front vehicle body reinforcing structure according to the exemplary embodiment of the present invention.
Figure 4:
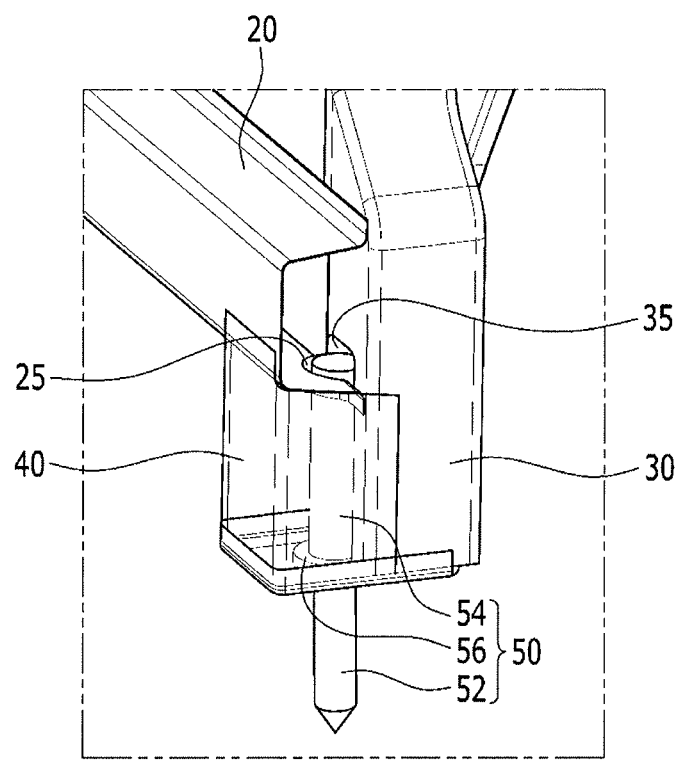
FIG. 4 is a view of FIG. 3 from another direction thereof.

FIG. 3 is a partial perspective view of the front vehicle body reinforcing structure according to the exemplary embodiment of the present invention, and FIG. 4 is a view of FIG. 3 from another direction thereof.

As shown in FIG. 2, FIG. 3 and FIG. 4, a front vehicle body reinforcing structure 1 according to an exemplary embodiment of the present invention further includes a sub-frame mounting member 40 and a mounting device 50.

The sub-frame mounting member 40 is combined to a lower side of the front end portion of the front side member 20 and to an inside of the front end portion in a width direction of the fender apron member 30. Furthermore, the sub-frame mounting member 40 has a three-dimensional box structure which forms a closed section in an up and down direction of the vehicle body 10. In this regard, a front end portion of the front side member 20, a front end portion of the fender apron member 30, and a front end portion of the sub-frame mounting member 40 are disposed on the same plane with respect to a front and rear direction of the vehicle body 10, and a lower end portion of the fender apron member 30 and a lower end portion of the sub-frame mounting member 40 are disposed on the same plane with respect to an up and down direction of the vehicle body 10. Furthermore, an inside surface in a width direction of the vehicle body 10 of the front end portion of the fender apron member 30 is connected to an outside surface in a width direction of the vehicle body 10 of the front side member 20 and to an outside surface in a width direction of the vehicle body 10 of the sub-frame mounting member 40. Therefore, a load is transferred to the front side member 20, the fender apron member 30, and the sub-frame mounting member 40 when a vehicle is in a head-on collision, an offset collision, or a small overlap collision, and at the present time, the front end portion of the front side member 20, the front end portion of the fender apron member 30, and the front end portion of the sub-frame mounting member 40 may together receive a load.

The mounting device 50 may be an engaging element including a bolt or a nut for mounting a sub-frame. Herein, the sub-frame, which is a constituent element of the vehicle body for mounting and supporting components including a suspension system, is well-known to a person of ordinary skill in the art, so a detailed description thereof will be omitted.

The mounting device 50 includes an engaging portion 52 engaged with the sub-frame under the sub-frame mounting member 40, an inserted portion 54 inserted into the sub-frame mounting member 40 from below the vehicle body 10, and a latch protrusion 56 formed between the engaging portion 52 and the inserted portion 54 and inserted into the sub-frame mounting member 40 to prevent the mounting device 50 from downwardly escaping from the sub-frame mounting member 40. Meanwhile, an upper end portion of the inserted portion 54 is inserted to reach the front side member 20, and an accommodating hole 25 is formed at a lower end portion of the front end portion of the front side member 20 to accommodate the upper end portion of the inserted portion 54. Furthermore, the inserted portion 54 is supported by the inside of the front end portion in a width direction of the fender apron member 30, and a seating groove 35 is formed at the inside of the front end portion in a width direction of the fender apron member 30 to seat a side surface of the inserted portion 54 thereon. In this regard, the accommodating hole 25 and the seating groove 35 are respectively formed in a shape to correspond with the upper end portion of the inserted portion 54 and the side surface of the inserted portion 54, and the upper end portion of the inserted portion 54 and the side surface of the inserted portion 54 may be manufactured in various shapes including a circular shape and a polygonal shape by a person of ordinary skill in the art. Meanwhile, while not illustrated in drawings, a hole, which is bored at the lower end portion of the sub-frame mounting member 40 to accommodate an upper end portion of the engaging portion 52, may be formed in a shape to correspond with an upper end portion of the engaging portion 52, and may be manufactured in various shapes including a circular shape and a polygonal shape by a person of ordinary skill in the art.

According to an exemplary embodiment of the present invention, an area receiving a load when a vehicle is in a small overlap collision can be enlarged as a set width E as the fender apron member 30 and the front side member 20 are overlapped in a width direction (referring to FIG. 1). Thus, performance of dispersing a load may be improved. Furthermore, structural rigidity to a head-on collision can be strong as a slanted angle of extending the fender apron member 30 forwardly is small. Furthermore, stiffness of coupling the sub-frame can be strong as the sub-frame mounting member 40 is combined to the lower end portion of the front side member 20 in a state of being overlapped with the fender apron member 30 in a width direction thereof.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure for a part at which a front side member and a fender apron member are connected to each other in a front vehicle body, comprising a sub-frame mounting member combined to a lower side of a front end portion of the front side member and to an inside of the front end portion in a width direction of the fender apron member, wherein an inside surface in a width direction of a vehicle body of the front end portion of the fender apron member is connected to an outside surface in a width direction of the vehicle body of the front side member and to an outside surface in a width direction of the vehicle body of the sub-frame mounting member, wherein the front end portion of the fender apron member has a three-dimensional box structure which forms a closed section in up and down directions of the vehicle body, and wherein the front side member has a three-dimensional box structure which forms a closed section in a front and rear direction of the vehicle body.

2. The front vehicle body reinforcing structure of claim 1, wherein an extending direction of the front end portion of the fender apron member and an extending direction of the front end portion of the front side member are disposed to be skewed.

3. The front vehicle body reinforcing structure of claim 2, wherein an included angle between an extension line of the fender apron member which extends to be upwardly slanted toward a rear of the vehicle body and an extension line of the front side member which extends in the front and rear direction of the vehicle body is small in comparison with a case of positioning an extending direction of the front end portion of the fender apron member and an extending direction of the front end portion of the front side member to be in parallel to each other.

4. The front vehicle body reinforcing structure of claim 1, wherein a front end portion of the front side member, a front end portion of the fender apron member, and a front end portion of the sub-frame mounting member are disposed on a same plane with respect to the front and rear direction of the vehicle body.

5. The front vehicle body reinforcing structure of claim 1, wherein a lower end portion of the fender apron member and a lower end portion of the sub-frame mounting member are disposed on a same plane with respect to the up and down directions of the vehicle body.

6. The front vehicle body reinforcing structure of claim 1, further including a mounting device combined to the sub-frame mounting member, wherein the mounting device includes:
an engaging portion protruded downwardly under the sub-frame mounting member;
an inserted portion inserted into the sub-frame mounting member from below the vehicle body; and
a latch protrusion formed between the engaging portion and the inserted portion to prevent downward escape from the sub-frame mounting member.

7. The front vehicle body reinforcing structure of claim 6, wherein an accommodating hole accommodating an upper end portion of the inserted portion is formed at a lower end portion of the front end portion of the front side member.

8. The front vehicle body reinforcing structure of claim 7, wherein a side surface of the inserted portion is supported by a seating groove which is formed at the inside of the front end portion in a width direction of the fender apron member.

9. The front vehicle body reinforcing structure of claim 8, wherein the accommodating hole and the seating groove are respectively formed in a shape to correspond with the upper end portion of the inserted portion and the side surface of the inserted portion.

10. The front vehicle body reinforcing structure of claim 1, wherein the sub-frame mounting member has a three-dimensional box structure which forms a closed section in the up and down directions of the vehicle body.

* * * * *